United States Patent [19]
Brinkley

[11] Patent Number: 5,968,354
[45] Date of Patent: Oct. 19, 1999

[54] APPARATUS FOR RECOVERING OIL-BASED LIQUID

[76] Inventor: Herman E. Brinkley, c/o Hydrocarbon Recovery Inc., Hi-Way OneSouth, P.O. Box 371, Lawrenceville, Ill. 62439

[21] Appl. No.: 08/856,847

[22] Filed: May 15, 1997

Related U.S. Application Data

[62] Division of application No. 08/345,832, Nov. 28, 1994, Pat. No. 5,643,449.

[51] Int. Cl.$^6$ .................................................. B01D 17/00
[52] U.S. Cl. ...................... 210/242.4; 210/386; 210/387; 210/400; 210/923; 210/924
[58] Field of Search ................................ 210/242.4, 400, 210/671, 923, 924, 386, 387

[56] References Cited

U.S. PATENT DOCUMENTS

| | | | |
|---|---|---|---|
| Re. 31,087 | 11/1982 | Sohl ........................................ 210/671 |
| 3,146,192 | 8/1964 | McClintock .............................. 210/40 |
| 3,147,216 | 9/1964 | Oemler .................................... 210/40 |
| 3,176,643 | 4/1965 | Spencer ................................... 112/266 |
| 3,617,555 | 11/1971 | Ginsburgh ............................ 210/242.4 |
| 3,617,556 | 11/1971 | Cole et al. ................................ 210/30 |
| 3,640,394 | 2/1972 | Brill et al. ............................... 210/924 |
| 3,667,608 | 6/1972 | Burroughs et al. ..................... 210/242 |
| 3,679,058 | 7/1972 | Smith . |
| 3,709,369 | 1/1973 | Brill et al. ............................... 210/924 |
| 3,739,913 | 6/1973 | Begosian ................................. 210/242 |
| 3,744,638 | 7/1973 | Rhodes .................................... 210/242 |
| 3,915,859 | 10/1975 | Sundin et al. . |
| 3,968,041 | 7/1976 | De Voss .................................. 210/242 |
| 3,986,959 | 10/1976 | Bagot et al. . |
| 4,052,306 | 10/1977 | Schwartz et al. ....................... 210/242 |
| 4,052,313 | 10/1977 | Rols ........................................ 210/242 |
| 4,065,923 | 1/1978 | Preus ........................................ 61/1 |
| 4,089,784 | 5/1978 | Ettelt et al. .............................. 210/923 |
| 4,111,813 | 9/1978 | Preus ....................................... 210/282 |
| 4,133,088 | 1/1979 | Hikobe et al. ............................ 28/279 |
| 4,165,282 | 8/1979 | Bennett et al. ........................... 210/40 |
| 4,234,420 | 11/1980 | Turbeville ............................... 210/671 |
| 4,234,424 | 11/1980 | Piepho .................................... 210/771 |
| 4,316,804 | 2/1982 | Bocard et al. ........................... 210/671 |
| 4,332,854 | 6/1982 | Parker ...................................... 428/377 |
| 4,366,067 | 12/1982 | Golding et al. ......................... 210/671 |
| 4,377,478 | 3/1983 | Rolls et al. ........................... 210/242.3 |
| 4,395,336 | 7/1983 | Eng ......................................... 210/693 |
| 4,416,782 | 11/1983 | Kerres ..................................... 210/634 |
| 4,439,324 | 3/1984 | Crotti ...................................... 210/691 |
| 4,652,372 | 3/1987 | Threadgill ............................... 210/923 |
| 4,737,394 | 4/1988 | Zafiroglu ................................. 428/102 |
| 4,743,483 | 5/1988 | Shimizu et al. ........................... 428/89 |
| 4,859,348 | 8/1989 | Jusaitis et al. .......................... 210/799 |
| 4,965,129 | 10/1990 | Bair et al. ................................ 428/398 |
| 5,002,814 | 3/1991 | Knack et al. .............................. 428/85 |

(List continued on next page.)

FOREIGN PATENT DOCUMENTS

| 971568 | 1/1951 | France . |
| 5594612 | 7/1980 | Japan . |

*Primary Examiner*—Jay H. Woo
*Assistant Examiner*—Fred Prince
*Attorney, Agent, or Firm*—Wood, Phillips, VanSanten, Clark & Mortimer

[57] ABSTRACT

An apparatus for recovering an oil-based liquid from a body of liquid including the oil-based liquid. The apparatus includes a pair of cooperating rollers defining a nip therebetween, an endless loop of oil-based liquid absorbent material that passes through the nip and extends from the cooperating rollers along a path into the oil-based liquid in the body to absorb the oil-based liquid from the body, and a diverter engaged with the material and spaced from the cooperating rollers along the path. The material is conveyed by the cooperating rollers along the path from the body and squeezed at the nip by the cooperating rollers to force the oil-based liquid to flow along the material. The diverter guides the oil-based liquid away from the material as the oil-based liquid flows along the material from the cooperating rollers. A scraper is engaged with the material ahead of the cooperating rollers along the path to remove debris from material prior to the material passing through the cooperating rollers.

14 Claims, 8 Drawing Sheets

U.S. PATENT DOCUMENTS

| | | | |
|---|---|---|---|
| 5,084,171 | 1/1992 | Murphy et al. | 210/238 |
| 5,165,821 | 11/1992 | Fischer et al. | 405/63 |
| 5,186,831 | 2/1993 | DePetris | 210/242.4 |
| 5,227,072 | 7/1993 | Brinkley | 210/671 |
| 5,229,006 | 7/1993 | Brinkley . | |
| 5,252,215 | 10/1993 | McFarlane et al. | 210/69.1 |
| 5,259,958 | 11/1993 | Bronnec et al. | 310/526 |
| 5,329,974 | 7/1994 | Paping | 141/11 |
| 5,374,600 | 12/1994 | Hozumi et al. | 502/402 |
| 5,378,371 | 1/1995 | Hobson | 210/242.4 |
| 5,403,478 | 4/1995 | Brinkley | 210/242.4 |

APPARATUS FOR RECOVERING OIL-BASED LIQUID

CROSS REFERENCE TO RELATED APPLICATIONS

This is a division of U.S. Ser. No. 08/345,832 entitled "APPARATUS FOR LIFTING OIL-BASED LIQUID" that was filed on Nov. 28, 1994, now U.S. Pat. No. 5,643,449.

TECHNICAL FIELD

This invention generally relates to a method of, and apparatus for, vertically lifting an oil-based liquid. More particularly, the invention relates to a method and apparatus for vertically lifting the oil-based liquid with a free hanging ribbon of an oil-based fluid absorbent material.

BACKGROUND OF THE INVENTION

Oil-based liquid refineries have many underground pipes for transporting the oil-based liquid. Gasoline service stations have underground pipes and tanks. Leaky pipes and tanks result in the oil-based liquid polluting the ground and ground water.

Solvents made from oil-based liquid are useful as cleaners. These solvents were often disposed of by pouring them on the ground which also results in pollution of the ground and ground water. Military bases are notorious for having disposed of solvents in this manner.

These subterranean oil-based liquid pollutants are often referred to as free products and they collect in what is known as fresh water sands. Some oil-based liquids are less dense, i.e., lighter, than water and float on the water surface. Other oil-based liquids are denser, i.e., heavier, than water and the water floats on the oil-based liquid.

It is difficult to clean up these subterranean oil-based liquids. Presently, a well is drilled into the ground to form a sump into which the oil-based liquid and water flow and from which the oil-based liquid is pumped to the surface. Often the water is pumped with the oil-based liquid, contaminating the oil-based liquid. Due to the cost of separating them, the oil-based liquid and water are either burned or buried which is expensive and results in a waste of the oil-based liquid—a non-renewable resource.

Skimmers are known for removing sump oil-based liquid located near the earth's surface. The skimmers are inserted in a hole and have a downwardly extending belt that is externally supported by a rigid rod along the path the belt travels. The distance the belt extends down is fixed because the length of the rod is fixed and cannot be varied in response to variations in the oil-based liquid or water levels. When the water level rises so that the belt extends into the water, the amount of water contaminating the oil-based liquid increases. The contaminated oil-based liquid is burned or buried which results in a loss of a nonrenewable resource. Also, the need for the rod limits the distance the belt can extend down because as the distance increases the length and diameter of the rod must also increase to support the belt.

Oil-based liquid that is denser than water often flows to, and collects under, the water in a lagoon, pond or lake making it difficult to remove, especially when the water is very deep. The water interferes with the removal.

Oil-based liquids are also useful as cleaners in many manufacturing processes, such as metal manufacturing. For example, in aluminum manufacturing, water, coolant and a water-soluble oil-based liquid are used in a washing/cooling step for the hot aluminum. Impurities, e.g., magnesium oxide and aluminum, become emulsified in some of the oil-based liquid in this step. The resulting hot water, coolant, oil-based liquid and emulsion are collected in a sump where the emulsion separates out to the top.

The water, coolant and oil-based liquid are pumped from the sump and used again in the washing/cooling step with make-up water, coolant and oil-based liquid. The emulsion is preferably not used in the washing/cooling step. Rigid hoops of an allegedly emulsion absorbent material have been rotated through the emulsion in an attempt to remove it from the sump. Unfortunately, the hoops do not absorb the emulsion, due in part to the graphite-like nature of the emulsion, and are ineffective. Because the emulsion cannot be removed, the interface between the emulsion and the recyclable water, coolant and oil-based liquid is not visible through the emulsion. Excess make-up water, coolant and oil-based liquid must be used to avoid accidentally pumping the emulsion.

A method and apparatus that can vertically lift the oil-based liquid using a free hanging ribbon is highly desirable.

SUMMARY OF THE INVENTION

The invention is embodied in an apparatus for recovering an oil-based liquid from a body of liquid including the oil-based liquid. The apparatus includes a pair of cooperating rollers defining a nip therebetween, an endless loop of oil-based liquid absorbent material that passes through the nip and extends from the cooperating rollers along a path into the oil-based liquid in the body to absorb the oil-based liquid from the body, and a diverter engaged with the material and spaced from the cooperating rollers along the path. The material is conveyed by the cooperating rollers along the path from the body and squeezed at the nip by the cooperating rollers to force the oil-based liquid to flow along the material. The diverter guides the oil-based liquid away from the material as the oil-based liquid flows along the material from the cooperating rollers.

In one form, the diverters include a pair of plates spaced from each other on opposite sides of the material, each plate having an edge engaged with the material.

In one form, the loop is a ribbon that has an interior cavity which fills with the oil-based liquid beneath the diverter as the loop is conveyed along the vertical path. The ribbon has an exterior surface and a slit through the exterior surface to allow the oil-based liquid trapped in the interior cavity to flow from the interior cavity to the exterior surface as the slit approaches the diverter along the vertical path from the body.

In one form, the diverter includes an elongated V-shaped trough conveying the oil-based liquid from the apparatus.

According to one aspect of the invention, an apparatus for recovering an oil-based liquid from a body of liquid including the oil-based liquid and debris is provided. The apparatus includes a pair of cooperating rollers defining a nip therebetween; an endless loop of oil-based liquid absorbent material that passes through the nip and extends from the cooperating rollers along a path into the oil-based liquid in the body, the material being conveyed by the cooperating rollers along the path from the body; and a scraper engaged with the material ahead of the cooperating rollers along the path to remove debris from the material prior to the material passing through the cooperating rollers.

In one form, the scraper includes a pair of plates spaced from each other on opposite sides of the material, each plate having an edge engaged with the material.

In one form, the plates extend at a downward angle into engagement with the material to remove debris from the material.

The apparatus is suitable for recovering oil-based liquids that pollute the ground and ground water, especially those that pollute fresh water sands. The method and apparatus are also suitable for recovering oil-based liquids that pollute other bodies of water.

The apparatus is also suitable for vertically lifting an emulsion of oil-based liquid and impurities produced in a metal manufacturing process, e.g., an aluminum manufacturing process. Being able to vertically lift the emulsion facilitates removal of the emulsion from a sump having the emulsion floating on a mixture of water, coolant and water-soluble oil-based liquid. Removal of the emulsion permits recycling of the water, coolant and oil-based liquid without the emulsion also being recycled. Therefore, the amount of make-up water, coolant and oil-based liquid is reduced because there is no emulsion present that can be accidentally recycled. The method and apparatus are capable of handling the emulsion, even though the emulsion is graphite-like.

The oil-based liquid can be recovered from the ribbon and used rather than burned or buried. The amount of the second liquid in the recovered oil-base liquid is minimized because the ribbon selectively absorbs the oil-based liquid rather than the second liquid.

Because the ribbon hangs freely, the ribbon can extend down a distance ranging from a few feet to hundreds of feet to recover the oil-based liquid. The absence of an external, fixed support permits the distance the ribbon extends to be varied as the level of the oil-based liquid varies.

Numerous other advantages and features of the present invention will become readily apparent from the following detailed description of the preferred embodiments and the appended claims.

DETAILED DESCRIPTION OF THE PREFERRED EMBODIMENTS

Although this invention is susceptible to embodiment in many different forms, there are described in detail herein, presently preferred embodiments of the invention. It should be understood, however, that the present disclosure is to be considered as an exemplification of the principles of this invention and is not intended to limit the invention to the embodiments described.

Figure 1:
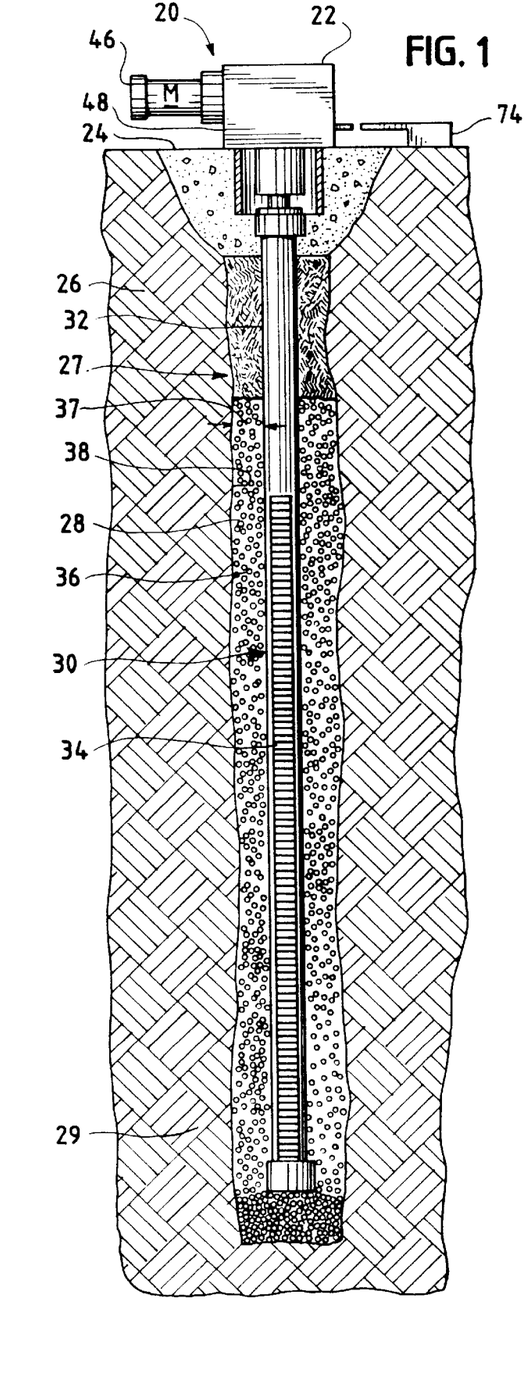
FIG. 1 is a vertical section illustrating a recovery apparatus of the present invention in an in ground sump.
Figure 2:
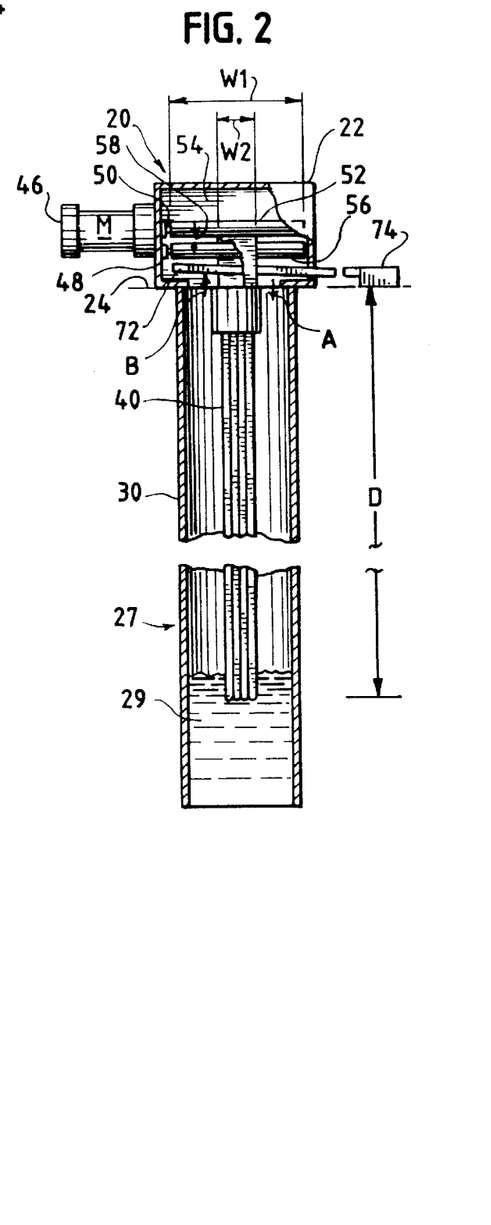
FIG. 2 is a vertical sectional view of the recovery apparatus.

FIGS. 1 and 2 illustrate a representative environment of an oil-based liquid recovery apparatus 20. Turning to FIG. 1, a housing 22 of the recovery apparatus 20 rests on a surface 24 of ground 26 over a sump 27. The sump 27 is formed by drilling a bore hole 28 into the ground 26 to provide access to a liquid body 29, that including oil-based liquid, located in the ground 26. A casing 30 is slid into the bore hole 28. The casing 30 has a top solid section 32 and a bottom slotted section 34. The casing 30 maintains the stability of the bore hole 28 to provide continued access to the liquid body 29. Small stones 36 are used to backfill space 37 between a bore hole wall 38 of the bore hole 28 and the casing 30. Hydrostatic pressure causes the liquid to percolate through the ground 26, the stones 36, the bottom slotted section 34 and into the casing 30.

As can best be seen in FIG. 2, the recovery apparatus 20 includes a freely hanging ribbon 40 (illustrated as being partially broken away) that is supported in, and extends down from, the housing 22, into the casing 30 a distance D, into the liquid body 29 and back up into the housing 22 in a continuous loop. The ribbon 40 is free of an external support (The term "external support" means a support, e.g., a rigid rod, that extends into the sump with the ribbon and that is positioned along the vertical path the ribbon travels.) along the vertical path it travels to and from the liquid body 29. Motor 46 is mounted on an exterior wall 48 of the housing 22. Drive shaft 50 extends from the motor 46, through the exterior wall 48, and is operably connected with a driven roller 52 within an interior space 54 of the housing 22. Operatively associated with the driven roller 52 is a follower roller 56. Both the driven roller 52 and the follower roller 56 are rotatably mounted within the interior space 54. Nip 58 is formed between the driven roller 52 and the follower roller 56 to receive the ribbon 40 therethrough. A V-shaped trough 72 is located under the follower roller 56 and adjacent to the ribbon 40. A second V-shaped trough 72, which cannot be seen in this view, is located adjacent to the ribbon 40 but on an opposite side of the ribbon 40 than the trough 72. The troughs 72 convey oil-based liquid recovered from the ribbon 40 to a separate tank 74 that holds the recovered oil-based liquid until it is recycled or processed further.

In operation, the apparatus 20 is put into position and the motor 46 is turned on. The driven roller 52 and the follower roller 56 cooperate to move the ribbon 40 downward in the direction indicated by arrow A into the liquid body 29. After passing through the liquid body 29, the ribbon 40 having absorbed oil-based liquid travels upward in the direction indicated by arrow B back into the housing 22. The ribbon 40 is compressed as it passes through the nip 58 to squeeze absorbed oil-based liquid therefrom the nip 58 has a width W1 parallel to the axes of rotation for the rollers 52, 56 that is greater than the width W2 of the ribbon 40 parallel to the axes of rotation, as seen in FIG 2. The oil-based liquid squeezed from the ribbon 40 flows back downward along the ribbon 40 and into the troughs 72 that move the recovered oil-based liquid into the tank 74.

Figure 3:
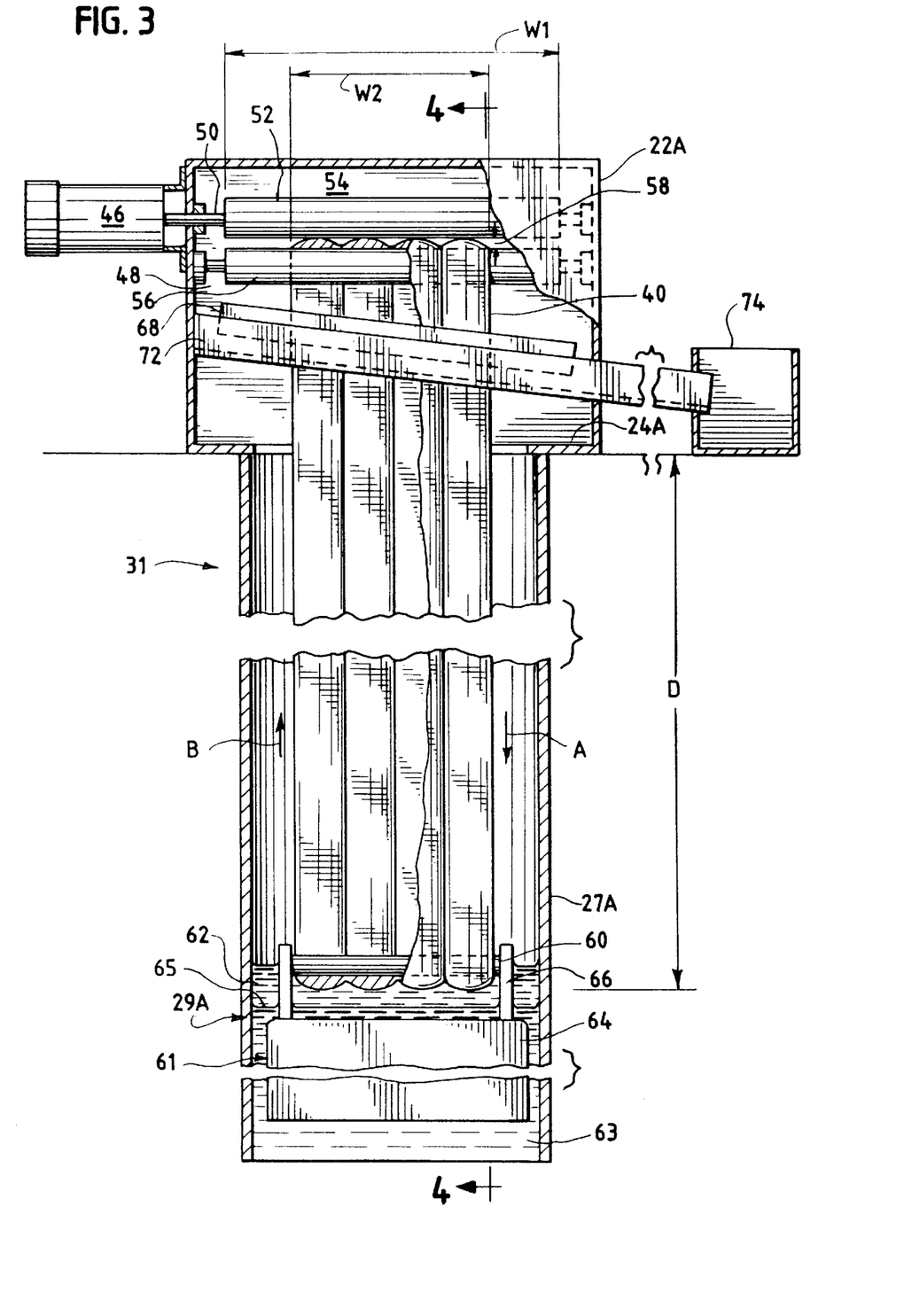
FIG. 3 is an enlarged vertical sectional view of an alternative recovery apparatus.
Figure 4:
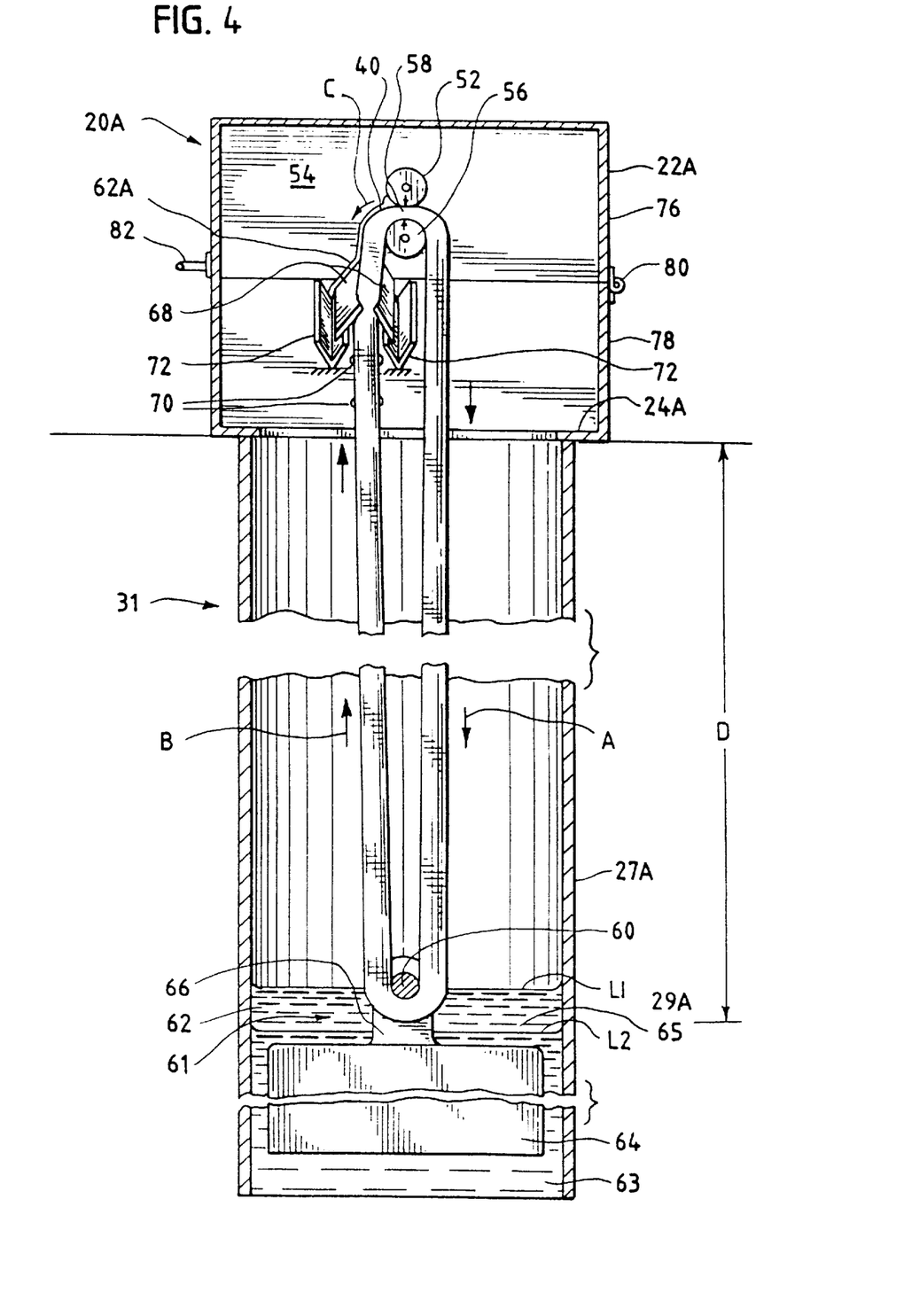
FIG. 4 is a vertical sectional view taken along line 4—4 of FIG. 3 with a ribbon that is not slack.
Figure 5:
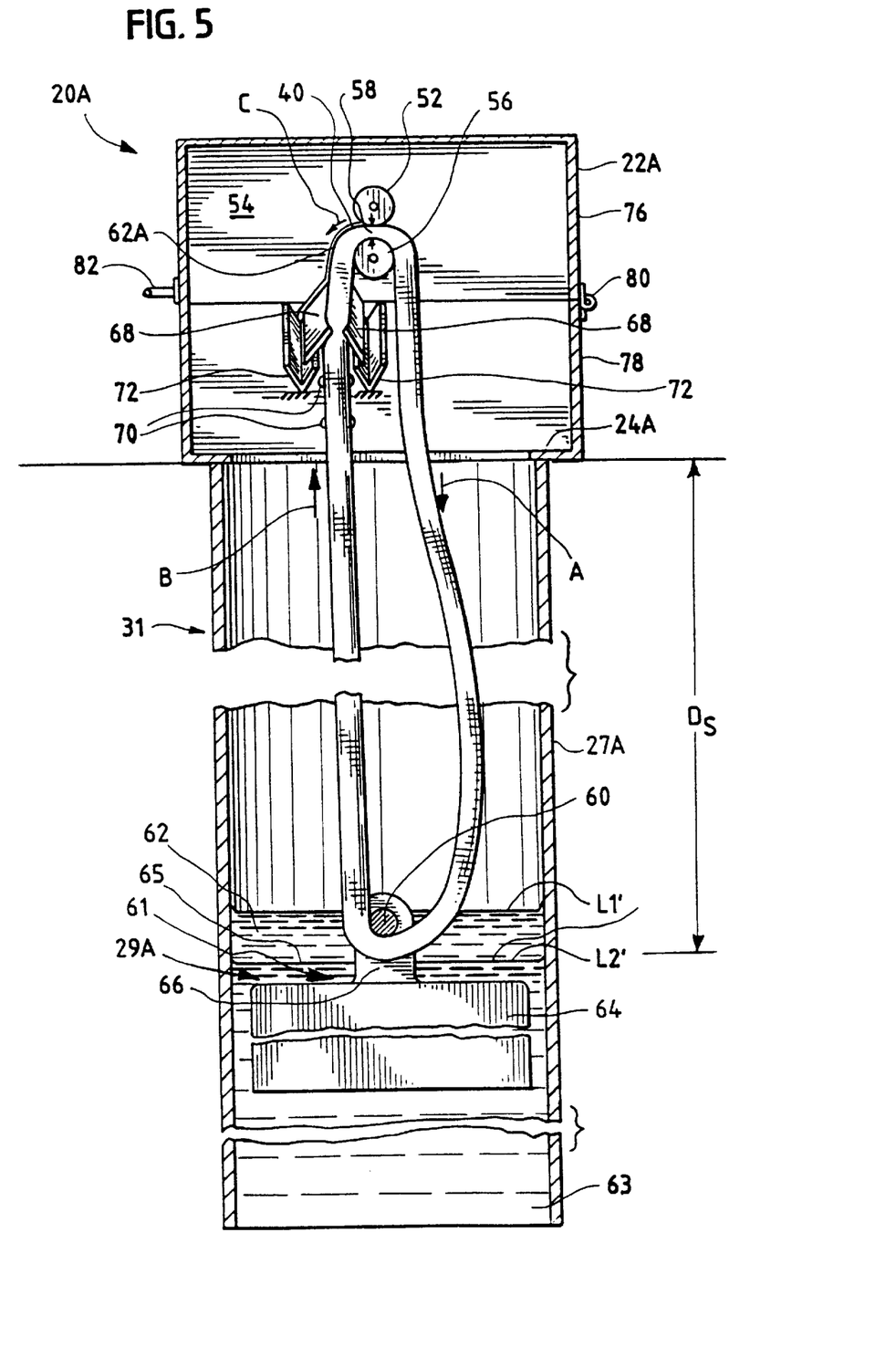
FIG. 5 is similar to FIG. 4 with a ribbon that is slack.

FIGS. 3–5 illustrate an alternative environment for the recovery apparatus 20A wherein the sump 27A is not formed by drilling a hole in the ground but rather is a structure XX that is placed in or above the ground. The housing 22A rests on the upper surface 24A with the ribbon 40 (illustrated as being partially broken away) extending down into the sump 27A a distance D and into the liquid body 29A. The motor 46, exterior wall 48, drive shaft 50, driven roller 52, interior space 54, follower roller 56 and nip 58 and their structural relationships are discussed above. The recovery apparatus 20A includes scrapers/diverters 68, on opposed sides of the ribbon 40 within the housing 22, are plates that preferably are at a 30–45° angle to the ribbon 40. The recovery apparatus 20A also includes a guide 61 having a guide roller 60 and a weight 64 connected by a support 66. The guide 61 is positioned in the liquid body 29 with the ribbon 40 passing therethrough.

In operation, the apparatus 20A is put into position and the motor 46 is turned on. The driven roller 52 and the follower roller 56 cooperate to convey the ribbon 40 downward in the direction indicated by arrow A where the guide roller 60 is positioned for guiding the ribbon 40 through oil-based liquid 62, illustrated as floating on second liquid 63 of the liquid body 29A. An interface 65 separates the oil-based liquid 62 and the second liquid 63.

After passing through the oil-based liquid 62, the ribbon 40 having absorbed oil-based liquid travels upward in the direction indicated by arrow B back into the housing 22. As can best be seen in FIG. 6, the scrapers/diverters 68 on opposed sides of the ribbon 40 are positioned to remove clinging particulate matter, debris and the like 70 from the ribbon 40 that would otherwise damage the driven roller 52 or the follower roller 56, not pass through the nip 58 or damage the ribbon 40 as it passes through the nip 58. In an alternative that is not illustrated, the scrappers/diverters 68 are spring loaded to urge them against the ribbon 40. The removed particulate matter, debris and the like 70 returns to the liquid body (not shown).

The ribbon 40 is compressed as it passes through the nip 58 to squeeze absorbed oil-based liquid 62A therefrom. The oil-based liquid 62A squeezed from the ribbon 40 flows back downward along the ribbon 40 in the direction indicated by arrow C (FIGS. 4 AND 5) and is diverted by the scrapers/diverters 68 into the troughs 72 that convey the recovered oil-based liquid 62A into the tank 74.

The mass of the weight 64 is selected to position the roller 60 to guide the ribbon 40 through the oil-based liquid 62 yet the amount is also selected to permit the guide 61 to have enough buoyancy to permit the guide 61 to float up and down in response to variations in the level of the oil-based liquid 62 and/or the second liquid 63. Referring to FIG. 4, the levels L1 and L2 of the oil-based liquid 62 and the second liquid 63, respectively, and the distance D that the ribbon 40 extends are illustrated. As the liquid levels L1 and L2 vary upward to L1' and L2' (FIG. 5), the buoyancy of the guide 61 assists in maintaining the ribbon 40 in the oil-based fluid 62 by the guide 61 floating upward. The natural buoyancy of the ribbon 40 also permits the ribbon 40 to be maintained in the oil-based liquid 62 in spite of a variation in the level, even in the absence of the guide 61. The ribbon 40 now contains slack and extends a shorter distance $D_s$ into the sump 27A. The structure permits the distance the ribbon 40 extends into the sump 27A to vary to maintain the ribbon 40 in the oil-based liquid 62.

The housing 22 has interchangeable upper section 76 and lower section 78 joined by a hinge 80. Handle 82 on the housing 22 is used to open the housing 22 as needed to provide access to the components of the recovery apparatus 20A located therein. As discussed below in connection with FIGS. 7–9, there are different embodiments for the driven roller 52, the follower roller 56, the diverter/scraper 68 and the troughs 72. The pairing of the driven roller 52 and the follower roller 56 in the upper section 76 with the scraper/diverter 68 and the troughs 72 in the lower section 78 can be varied by combining different upper and lower sections 76 and 78, respectively, containing the same.

Figures 6, 7:
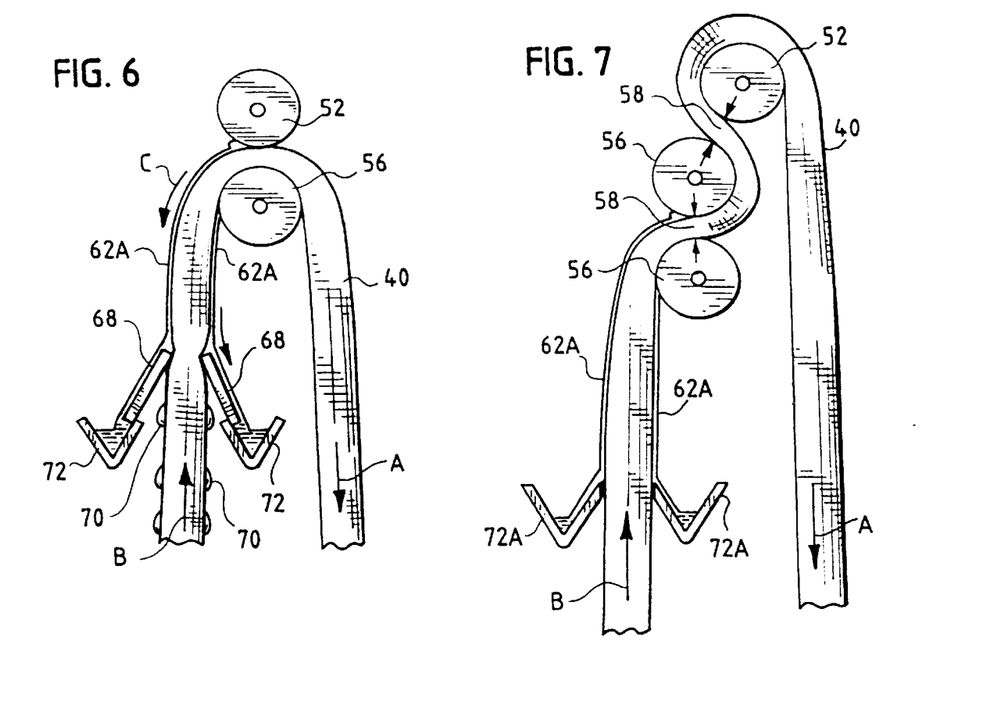
FIG. 6 is a fragmentary, vertical sectional view of rollers, scrapers/diverters and troughs of the apparatus of FIG. 3.
FIG. 7 is a fragmentary, vertical sectional view of a modified arrangement for the rollers and troughs.

In the alternative embodiment illustrated in FIG. 7, three horizontal, parallel rollers are stacked on top of each other with the driven roller 52 being positioned above the two follower rollers 56. The ribbon 40 passing through the nips 58 between adjacent rollers and over the top of the driven roller 52. The order of the rollers 52, 56 in the stack is variable. This roller arrangement is particularly well suited for use when the recovery apparatus is used to recover dense oil-based liquid from a great depth which requires a very long ribbon 40 that is very heavy after it absorbs the oil-based liquid.

FIG. 7 also illustrates an alternative embodiment wherein separate scrapers/diverters are not utilized. Instead, the troughs 72A are positioned adjacent the ribbon 40 such the particulates are removed by the troughs 72A.

Figure 8:
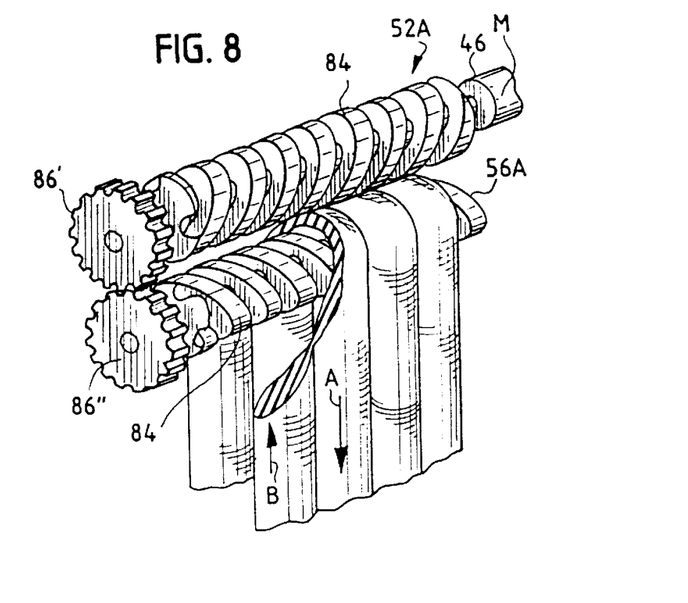
FIG. 8 is a fragmentary perspective view of a modified arrangement for the rollers.

In the alternative embodiment illustrated in FIG. 8, the driven roller 52A and the follower roller 56A have interlocking surfaces 84 that cooperate to convey the ribbon 40 and prevent slippage of the ribbon 40 between the rollers 52A, 56A. These rollers are particularly well suited when the ribbon 40 contains absorbed oil-based liquid that is graphite-like so that the ribbon 40 is slippery and not moved by rollers having a smooth surface, or for use when the ribbon 40 becomes very heavy when saturated with the oil-based liquid.

FIG. 8 also illustrates an alternative wherein the rollers 52A, 56A have gears 86' and 86", respectively, that preferably are located at an opposite end of the rollers 52A, 56A from the motor 46. When the motor 46 drives the driven roller 52A, it drives gear 86' which cooperates with gear 86" to drive follower roller 56A. It is not necessary that the interlocking surfaces 84 and the gears 86', 86" be used together.

Figure 9:
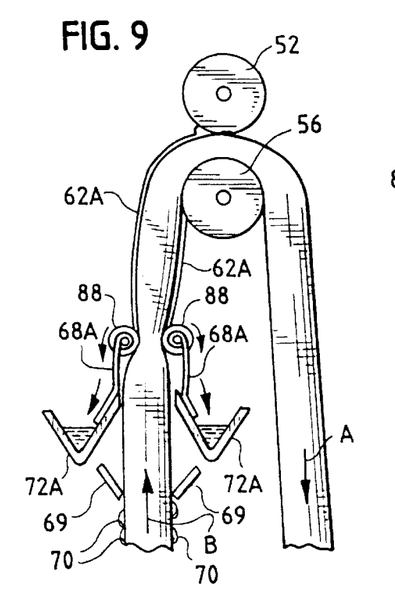
FIG. 9 is a fragmentary, vertical sectional view of another alternative arrangement for the rollers, scrapers/diverters and troughs.

FIG. 9 illustrates an alternative wherein the scrapers/diverters 68A have rollers 88 that squeeze oil-based liquid 62A from the ribbon 40. The driven roller 52 and the follower roller 56 also squeeze oil-based liquid 62A from the ribbon 40 as it travels in the direction indicated by arrow A. The oil-based liquid 62A, whether squeezed from the ribbon 40 by the rollers 88 or the driven roller 52 and follower roller 56, collects in the troughs 72A which are positioned adjacent to the ribbon 40 as discussed above.

FIG. 9 also illustrates optional scrapers 69 positioned below the troughs 72A and on either side of the ribbon 40 and that point down and towards the ribbon 40. The scrapers 69 are useful when there is a large amount of heavy particulates 70.

Figure 10:
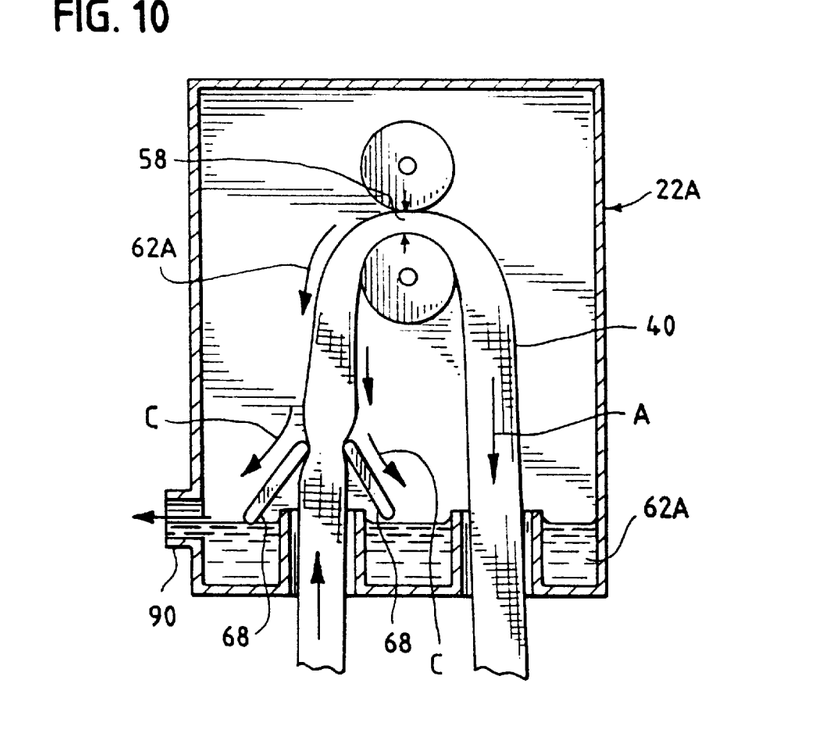
FIG. 10 is a fragmentary view of the interior of a housing of the recovery apparatus.

FIG. 10 illustrates an alternative embodiment wherein the housing 22A provides temporary storage for recovered oil-based liquid 62A therein. As the ribbon 40 travels through the nip 58 in the direction indicated by arrow A, the ribbon 40 is squeezed to remove oil-based liquid 62A therefrom. The removed oil-based liquid 62A travels in the direction indicated by arrows C, over the diverters/scrapers 68 and into the housing 22A. The recovered oil-based liquid is removed through pipe 90 to a separate holding tank (not shown).

Figure 11:
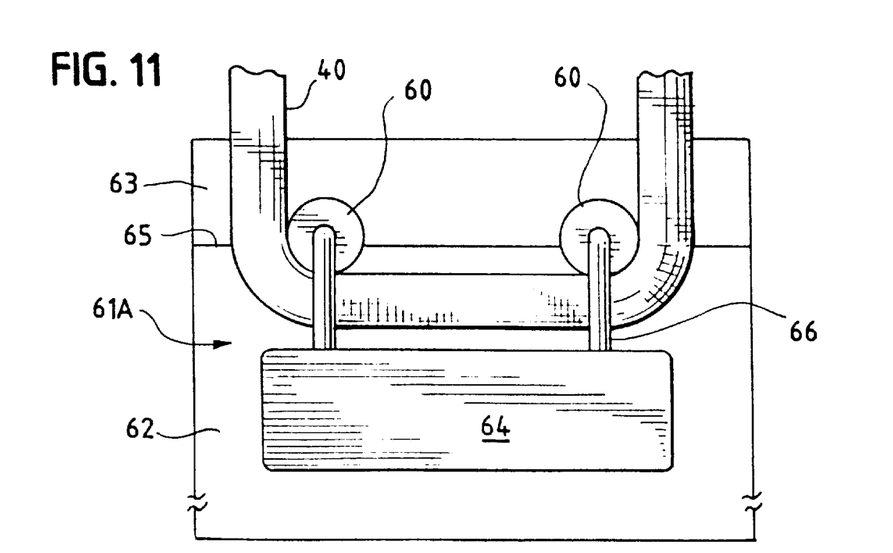
FIG. 11 is a fragmentary view a guide of the recovery apparatus.

FIG. 11 illustrates an alternative embodiment wherein the guide 61A includes a pair of spaced guide rollers 60. The second liquid 63 is shown floating on the oil-based liquid 62, although the embodiment is also useful when the oil-based liquid 62 floats on the second liquid 63. The spaced guide rollers 60 cause the ribbon 40 to travel horizontally through the oil-based liquid 62 to increase the time in which the ribbon 40 is in contact with the oil-based liquid 62 and hence increases the time available for the ribbon 40 to absorb the oil-based liquid 62. The distance the guide rollers 60 are spaced, the type of material for the ribbon 40 and the speed at which the ribbon 40 travels are selected so that the ribbon 40 absorbs the maximum amount of oil-based liquid 62 that the ribbon 40 is capable of absorbing while the ribbon 40 is in the oil-based liquid 62.

The mass of the weight 64 is selected to position the rollers 60 to guide the ribbon 40 through the oil-based liquid 62. Preferably, amount of the weight 64 is selected so that the rollers 60 are positioned so that they guide the ribbon 40 adjacent to the interface 65 of the oil-based liquid 62 and the second liquid 63. Preferably, the amount of the weight 64 is also selected so that the guide 61A is buoyant enough to permit the guide 61A to float up and down in response to variations in the level of the oil-based liquid 63 and/or the second liquid 63.

Figure 12:
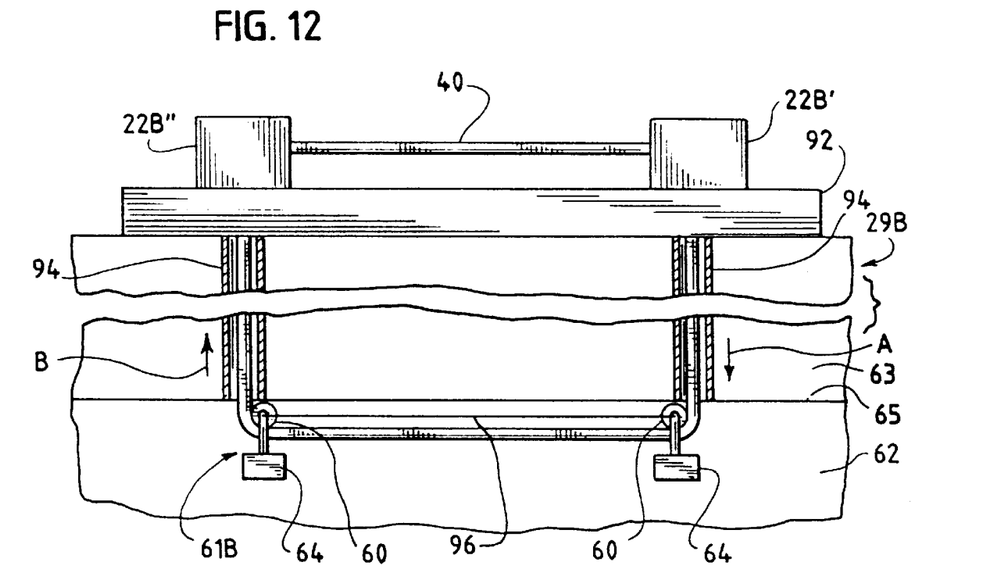
FIG. 12 is a fragmentary view of a recovery apparatus with an alternative guide.

The alternative embodiment of the recovery apparatus 20B illustrated in FIG. 12 includes a floating platform 92 that supports a pair of spaced housings 22B' and 22B" and floats on the liquid body 29B illustrated as a pond or lake. The platform 92 is illustrated as floating on the second liquid 63 which itself is floating on the oil-based liquid 62. That is, the oil-based liquid 62 is heavier than the second liquid 63. The ribbon 40 travels in the clockwise direction as indicated by the arrows A and B. After the ribbon 40 passes from housing 22B' and through the platform 92, it enters a first sleeve 94 that extends downward from the underside of the platform 92 into the second liquid 63 and is directed to travel a distance horizontally by the guide 61B before the guide 61B directs the ribbon 40 up a second sleeve 94 and to the housing 22B" where the absorbed oil-based liquid is recovered in the manner previously described.

The guide 61B is positioned in the oil-based liquid 62 and guides the ribbon 40 for an extended distance through the oil-based liquid 62. In addition to the two spaced pairs of guide rollers 60 and weights 64, the guide 61B also includes a rigid connector 96 that maintains the pairs of guide rollers 60 and the weights 64 a distance from each other. The weights 64 extend downwardly and the amounts of the weights are selected to maintain the ribbon 40 in the oil-based liquid 62. Preferably, the weights 64 maintain the ribbon 40 adjacent to the interface 65.

The sleeves 94 preferably extend into, and are filled with, oil-based liquid 62 so that the ribbon 40 is isolated from the second liquid 63 as it passes therethrough. Isolation helps minimize absorption of the second liquid by the ribbon 40. Isolation also helps minimize mixing absorbed oil-based liquid into the second liquid 63. The first sleeve 94 is optional if the second liquid 63 is not absorbed by the ribbon 40. The second sleeve 94 is optional if the absorbed oil-based liquid 62 will not be removed from the ribbon 40 when the ribbon 40 having absorbed oil-based liquid 62 passes through the second liquid 63.

Figure 13:
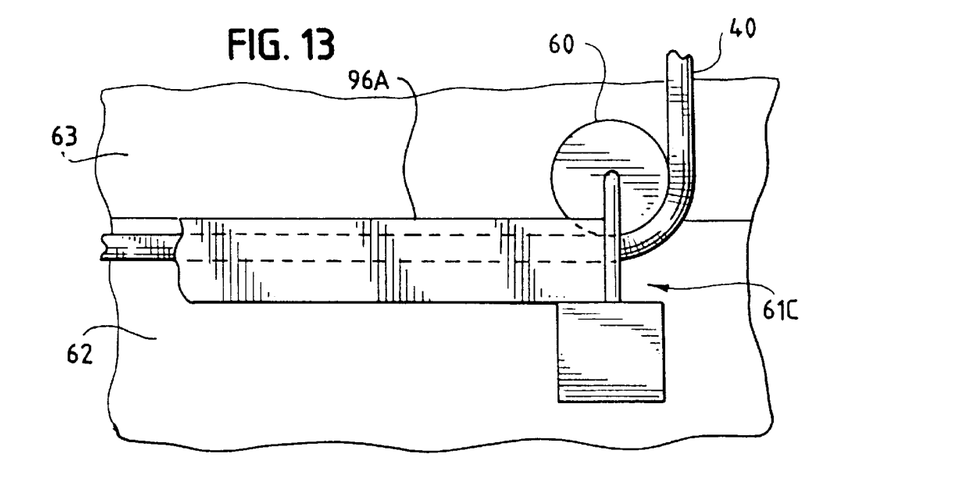
FIG. 13 is a fragmentary view of an alternative guide.

FIG. 13 illustrates an alternative embodiment of the recovery apparatus of FIG. 12 wherein the connector 96A is attached to the guide rollers 60 and is a C-shaped, U-shaped or multi-sided channel extending over the ribbon 40 with the open side facing down. The connector 96A provides further isolation of the ribbon 40 from the second liquid 63. The weight of the connector 96A is taken into consideration when selecting the amount of the weight 64 so that the guide 61C maintains the ribbon 40 in the oil-based liquid 62 even when the level varies.

Figure 14:
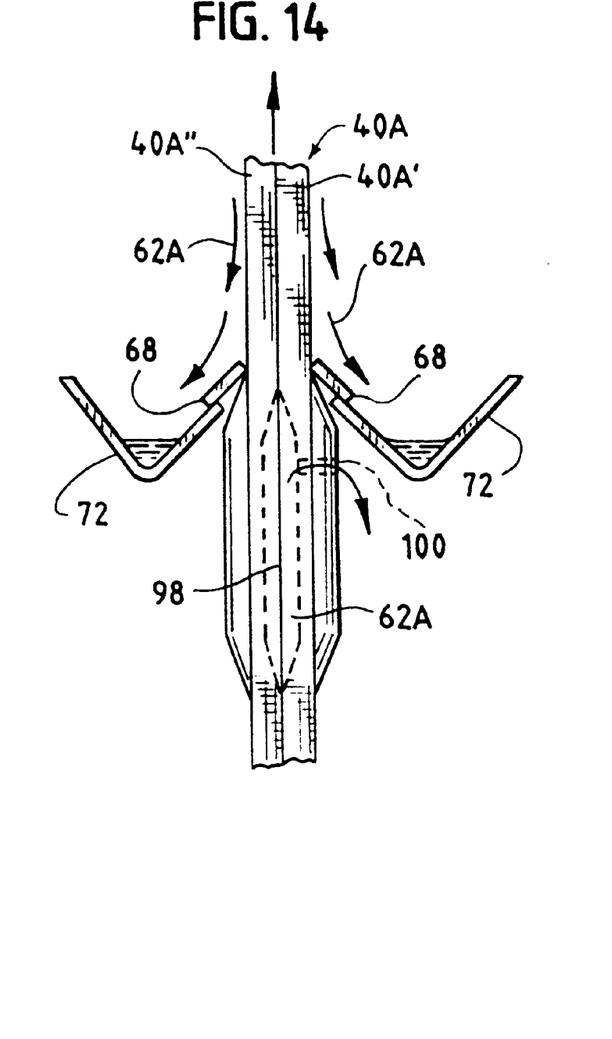
FIG. 14 is a fragmentary sectional view of a ribbon defining a cavity.

FIG. 14 illustrates an alternative wherein the ribbon 40A is a tube so that a cross-section of the ribbon 40A reveals two halves 40A' and 40A". A movable cavity 98 forms inside the tube beneath the scrapers/diverters 68. One half 40A" of the ribbon 40A has at least one slit 100 that provides liquid communication between the cavity 98 and the exterior of the ribbon 40A. As the ribbon 40A travels through the scrappers/diverters 68, oil-based liquid 62A collects in the cavity 98 until the slit 100 reaches the cavity 98. The oil-based liquid 62A then flows through the slit 100 to the exterior of the ribbon 40A and back into the liquid body.

Figure 15:
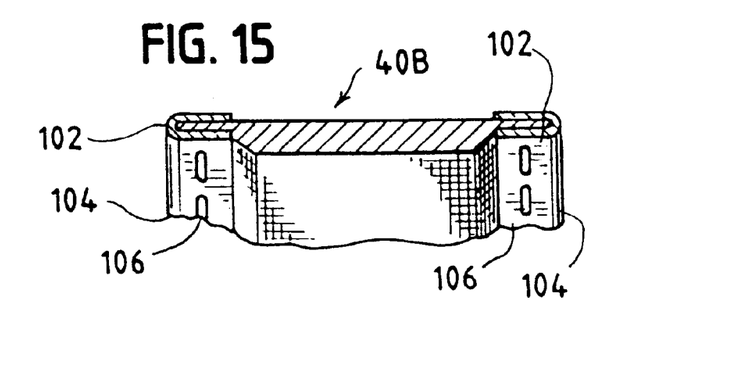
FIGS. 15 is a view of a section of an alternative ribbon having a backing.

FIGS. 15 illustrates the ribbon 40B having a thin backing 102 of non-stretch fabric that inhibits stretching and deformation of the ribbon 40B as it passes through the recovery apparatus. As can best be seen in FIG. 15B, the backing 102 is preferably positioned along each outer edge 104 of the ribbon 40B. Stitches 106 positioned slightly in from the outer edges 104 securely hold the ribbon 40B together. Locating the stitches 106 near the outer edges 104 minimizes the area from which channels (not shown) that are produced along the stitches 106 when the ribbon 40A is in use can receive oil-based liquid, thus minimizing the amount of oil-based liquid that flows along the stitches 106 and back into the liquid body rather than being recovered.

The method includes the steps of providing the free hanging ribbon and conveying the oil-based liquid from the liquid body with the ribbon in a substantially vertical path. An additional step of the method is the step of varying the distance the ribbon extends down as the oil-based liquid level varies to maintain the ribbon in the oil-based liquid.

When the liquid body includes a second liquid having a variable level, and the second liquid is denser than the oil-based liquid, the method includes the step of varying the distance the ribbon extends down to maintain the ribbon in the oil-based liquid in response to a variation of the level of the second liquid. Alternatively, when the oil-based liquid is denser than the second liquid, the method includes the step of varying the distance the ribbon extends to maintain the ribbon in the oil-based liquid in response to a variation in the level of the oil-based liquid. In this arrangement where the second liquid floats on the oil-based liquid, the method preferably includes the steps of passing the ribbon through the second liquid and isolating the ribbon from the second liquid during the passing step.

The ribbon is preferably made of a cloth having at least one nap that defines voids therein. The cloth is preferably hydrophobic. A preferred cloth is disclosed in U.S. Pat. Nos. 5,227,072 and 5,229,006, both to Brinkley, and U.S. Ser. No. 08/081,510 to Brinkley, the inventor of this apparatus and method. Both of these patents and the application are incorporated herein by reference in their entirety.

The width of the ribbon preferably is in the range of about 2 to about 10 inches.

Representative oil-based liquids include: crude oils, i.e., hydrocarbons; mineral oils, e.g., petroleum and petroleum-derived, e.g. lubricants; fuel oils, heating oils and the like; vegetable oils, e.g., drying oils, non-drying oils and the like; animal oils, e.g., fish oils, sperm oil and the like; products obtained from hydrocarbons, e.g., solvents; mixtures of oil-based liquids and impurities; emulsions of oil-based liquids and impurities, that are discussed below; and the like. Representative drying oils include linseed oil, tung oil and the like. Representative non-drying oils include caster oil, coconut oil and the like.

Representative of the second liquid are water and the emulsion of oil-based liquids and impurities, that are discussed below. The emulsion can float on the oil-based liquid so that in effect there are two oil-based liquids with one floating on the other.

The second liquid can be denser than the oil-based liquid so that the oil-based liquid floats on the second liquid. Alternatively, the oil-based liquid can be denser than the second liquid so that the second liquid floats on the oil-based liquid.

Representative emulsions of impurities in oil-based liquid occur in the manufacturing of ferrous and nonferrous materials. The material is sprayed with water, oil-based liquid and coolant which results in impurities becoming emulsified in the oil-based fluid. After spraying, the now hot water, oil-based fluid, coolant and emulsion are collected in a sump with the emulsion floating on top of the water, oil-based fluid and coolant. It is desirable to maintain the heat in the sump to keep the viscosity of the emulsion low. The scraper/diverter and the troughs are preferably positioned to retain the heat in the sump.

The recovery apparatus is used to remove the emulsion from the sump. Removing the emulsion permits the water, oil-based fluid and coolant to be recycled.

Representative impurities include minerals and metals and their oxides that are the result of the production of ferrous and nonferrous materials such as steel, aluminum and the like. Specific impurities from an aluminum manufacturing process include magnesium oxide and aluminum. The emulsion has the characteristics of the oil-based liquid so that it is perceived by the ribbon to be an oil-based liquid and is absorbed.

It presently is theorized that the above-described advantages are achieved because the ribbon hangs freely which permits varying the distance which the ribbon extends down into the sump. Varying is achieved with or without the guide. Varying cannot be obtained if an external support is used.

The guide is designed so that the amount of the weight is such that the guide has the desired buoyancy. When the oil-based liquid floats on the second liquid, the amount of the weight is selected so that the guide roller is positioned to guide the ribbon through the oil-based liquid to be recovered. If the second liquid level rises, the buoyancy of the guide causes the guide roller to float upwards to maintain the ribbon in the oil-based liquid by the ribbon becoming slack. If the level of the second liquid drops so that the level of the oil-based liquid also drops and there is slack in the ribbon, the guide also drops to maintain the ribbon in the oil-based liquid.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

I claim:

1. An apparatus for recovering an oil-based liquid from a body of liquid including the oil-based liquid, comprising:

a pair of cooperating rollers defining a nip therebetween having a width W1 extending parallel to axes of rotation for the rollers;

an endless loop of oil-based liquid absorbent material, the material passing through the nip and extending from the cooperating rollers along a path into the oil-based liquid in the body to absorb the oil-based liquid from the body, the material being conveyed by the cooperating rollers along the path from the body and having a width W2 parallel to the axes of rotation that is squeezed at the nip by the cooperating rollers to force the oil-based liquid to flow along the material, W2 being no greater than W1; and a diverter engaged with the material and spaced from the cooperating rollers along the path, the diverter guiding the oil-based liquid away from the material as the oil-based liquid flows along the material from the cooperating rollers.

2. The apparatus of claim 1 wherein the diverter comprises a pair of plates spaced from each other on opposite sides of the material, each plate having an edge engaged with the material.

3. The apparatus of claim 2 wherein each plate is positioned to form an angle with the material in the range from 30 degrees to 45 degrees.

4. The apparatus of claim 1 wherein the diverter comprises a pair of diverter rollers spaced from each other on opposite sides of the material, the diverter rollers squeezing the oil-based liquid from the material.

5. An apparatus for recovering an oil-based liquid from a body of liquid including the oil-based liquid, comprising:

a pair of cooperating rollers defining a nip therebetween;

an endless loop of oil-based liquid absorbent material, the material passing through the nip and extending from the cooperating rollers along a path into the oil-based liquid in the body to absorb the oil-based liquid from the body, the material being conveyed by the cooperating rollers along the path from the body and squeezed at the nip by the cooperating rollers to force the oil-based liquid to flow along the material; and a diverter engaged with the material and spaced from the cooperating rollers along the path, the diverter guiding the oil-based liquid away from the material as the oil-based liquid flows along the material from the cooperating rollers;

wherein the loop comprises a ribbon that has an interior cavity which fills with the oil-based liquid beneath the diverter as the loop is conveyed along the path, the ribbon having an exterior surface and a slit through the exterior surface to allow the oil-based liquid trapped in the interior cavity to flow from the interior cavity to the exterior surface as the slit approaches the diverter along the vertical path from the body.

6. The apparatus of claim 1 wherein the diverter comprises an elongated trough conveying the oil-based liquid from the apparatus.

7. An apparatus for recovering an oil-based liquid from a body of liquid including the oil-based liquid, comprising:

a pair of cooperating rollers defining a nip therebetween;

an endless loop of oil-based liquid absorbent material, the material passing through the nip and extending from the cooperating rollers along a path into the oil-based liquid in the body to absorb the oil-based liquid from the body, the material being conveyed by the cooperating rollers along the path from the body and squeezed at the nip by the cooperating rollers to force the oil-based liquid to flow along the material; and a diverter engaged with the material and spaced from the cooperating rollers along the path, the diverter guiding the oil-based liquid away from the material as the oil-based liquid flows along the material from the cooperating rollers, wherein the diverter comprises an elongated V-shaped trough conveying the oil-based liquid from the apparatus.

8. The apparatus of claim 1 wherein the path is a substantially vertical path and the diverters are spaced beneath the cooperating rollers along the vertical path to guide the oil-based liquid away from the material as the oil-based liquid flows down the material from the cooperating rollers.

9. An apparatus for recovering an oil-based liquid from a body of liquid including new oil-based liquid, comprising:

a pair of cooperating rollers defining a nip therebetween;

an endless loop of oil-based liquid absorbent material, the material passing through the nip and extending from the cooperating rollers along a substantially vertical path into the oil-based liquid in the body to absorb the oil-based liquid from the body, the material being conveyed by the cooperating rollers along the path from the body and squeezed at the nip by the cooperating rollers to force the oil-based liquid to flow along the material;

a diverter engaged with the material and spaced beneath the cooperating rollers along the vertical path, the diverter guiding the oil-based liquid away from the material as the oil-based liquid flows down the material from the cooperating rollers; and a pair of scrapers engaged with the material beneath the diverter along the vertical path, the scrapers extending at a downward angle into engagement with the material to remove debris from the material prior to the material passing through the diverter and the cooperating rollers.

10. An apparatus for recovering an oil-based liquid from a body of liquid including the oil-based liquid and debris, comprising:

a pair of cooperating rollers defining a nip therebetween;

an endless loop of oil-based liquid absorbent material, the material passing through the nip and extending from the cooperating rollers along a path into the oil-based liquid in the body to absorb the oil-based liquid from the body, the material being conveyed by the cooperating rollers along the path from the body; and a scraper engaged with the material ahead of the cooperating rollers along the path to remove debris from the material prior to the material passing through the cooperating rollers.

11. The apparatus of claim 10 wherein the scraper comprises a pair of plates spaced from each other on opposite sides of the material, each plate having an edge engaged with the material.

12. The apparatus of claim 11 wherein the plates extend at a downward angle into engagement with the material to remove debris from the material.

13. The apparatus of claim 11 wherein the path is a substantially vertical path and the scrapers are engaged with the material beneath the cooperating rollers along the vertical path.

14. The apparatus of claim 13 wherein the material is squeezed by the cooperating rollers at the nip to force the oil-based liquid to flow down the material along the vertical path and wherein the plates extend at an upward angle into engagement with the material to guide the oil-based liquid away from the material as the oil-based liquid flows down the material from the cooperating rollers.

* * * * *